May 4, 1937.　　　I. B. LASKOWITZ　　　2,079,217
AUTO-CYCLO-GYRO
Filed Aug. 10, 1933　　　4 Sheets-Sheet 3
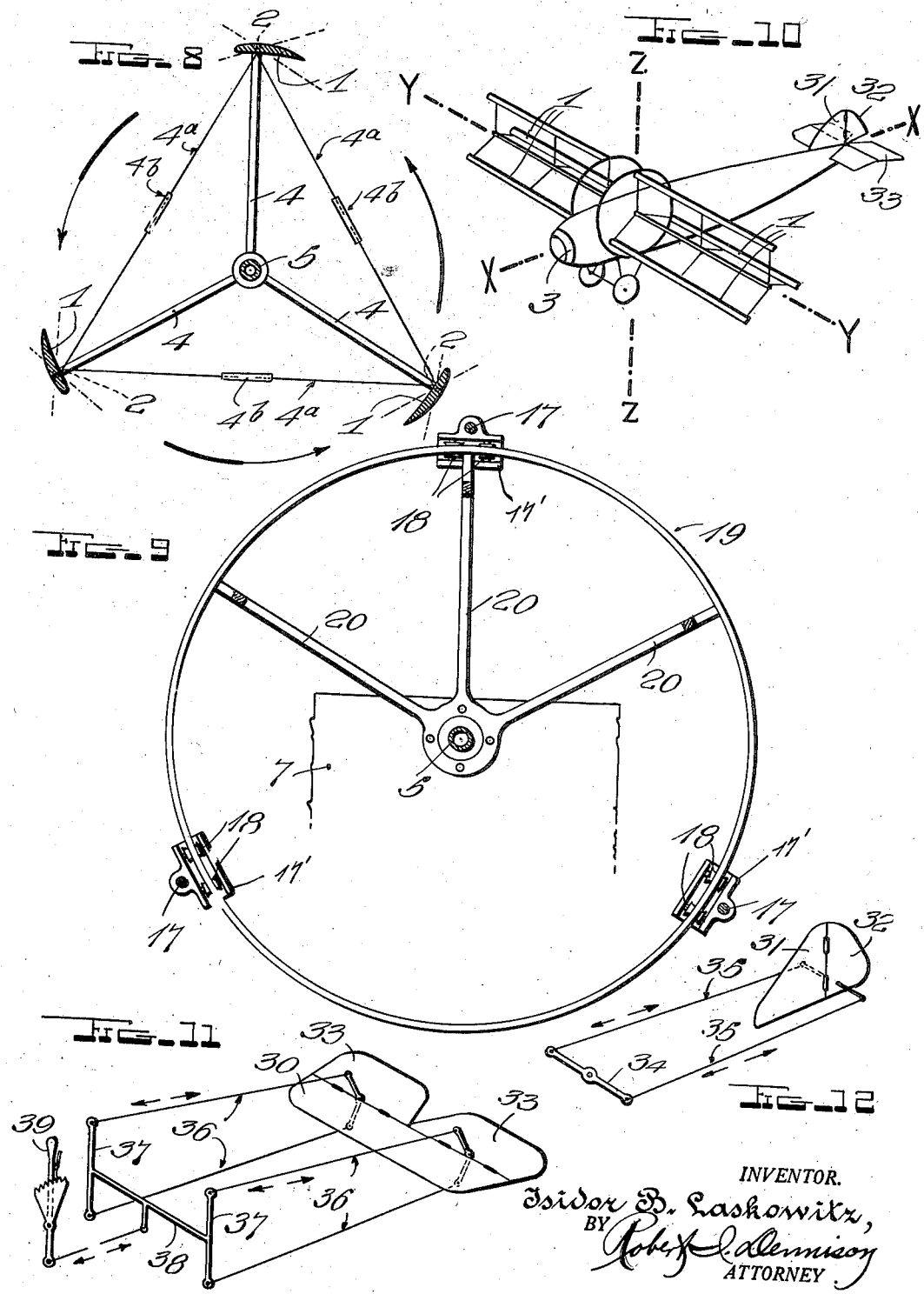
INVENTOR.
Isidor B. Laskowitz,
BY Robert L Dennison
ATTORNEY

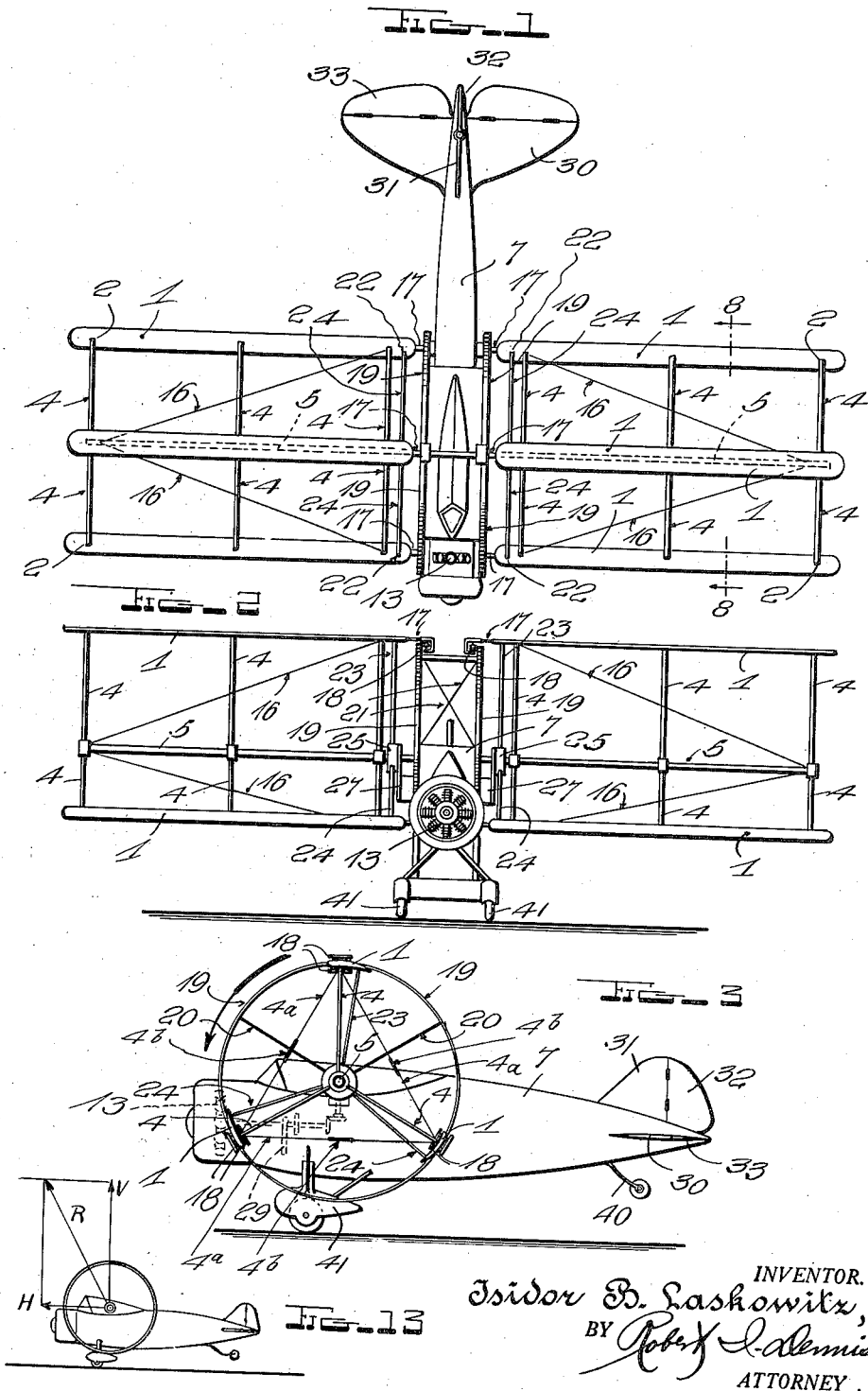

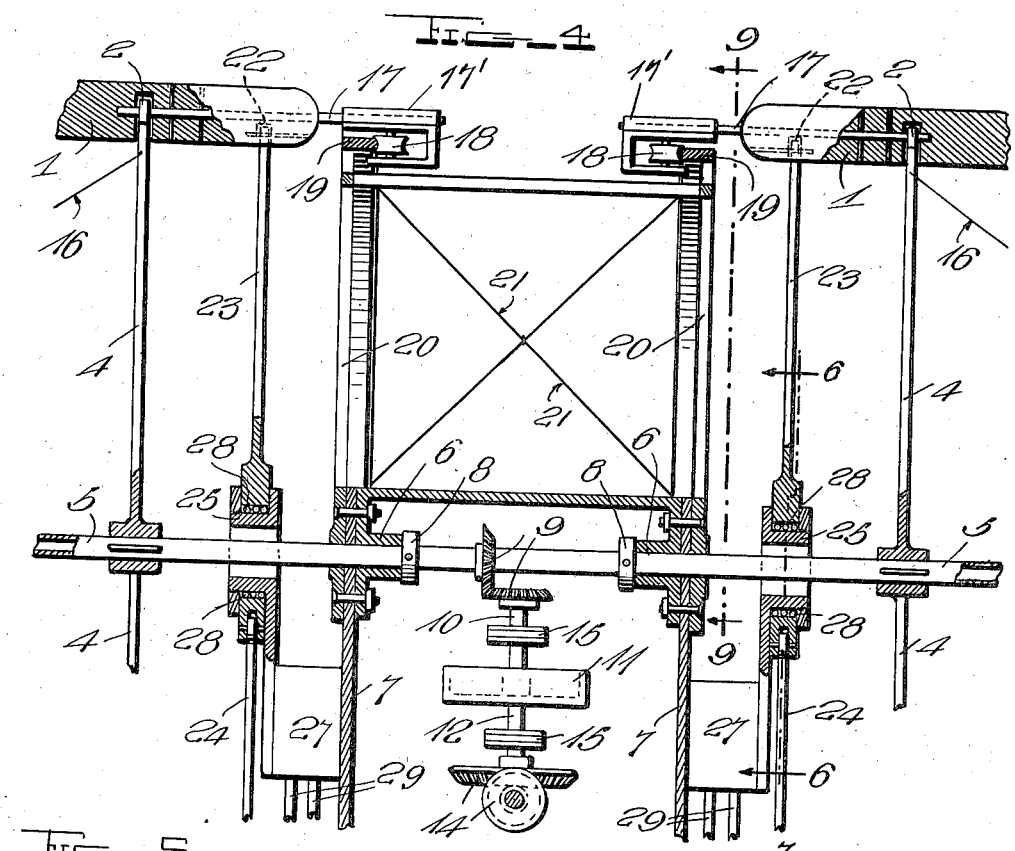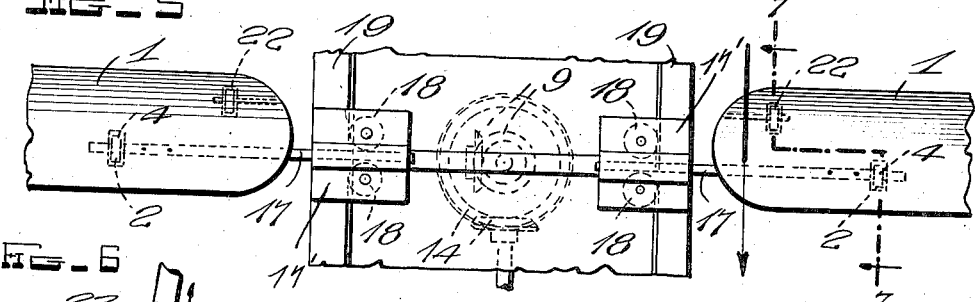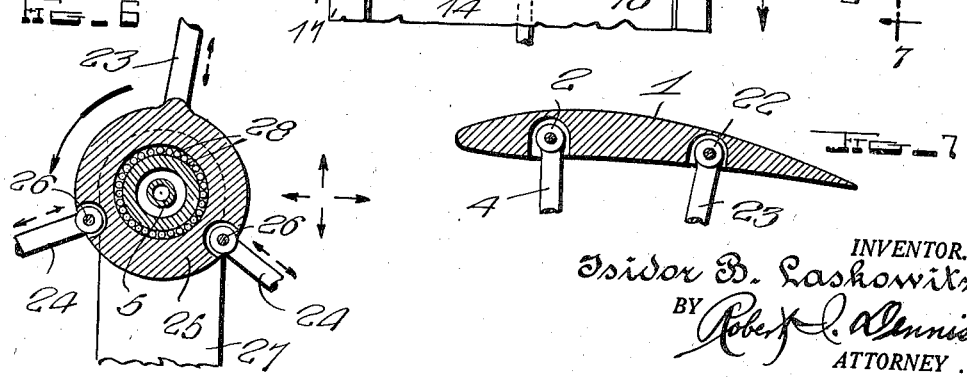

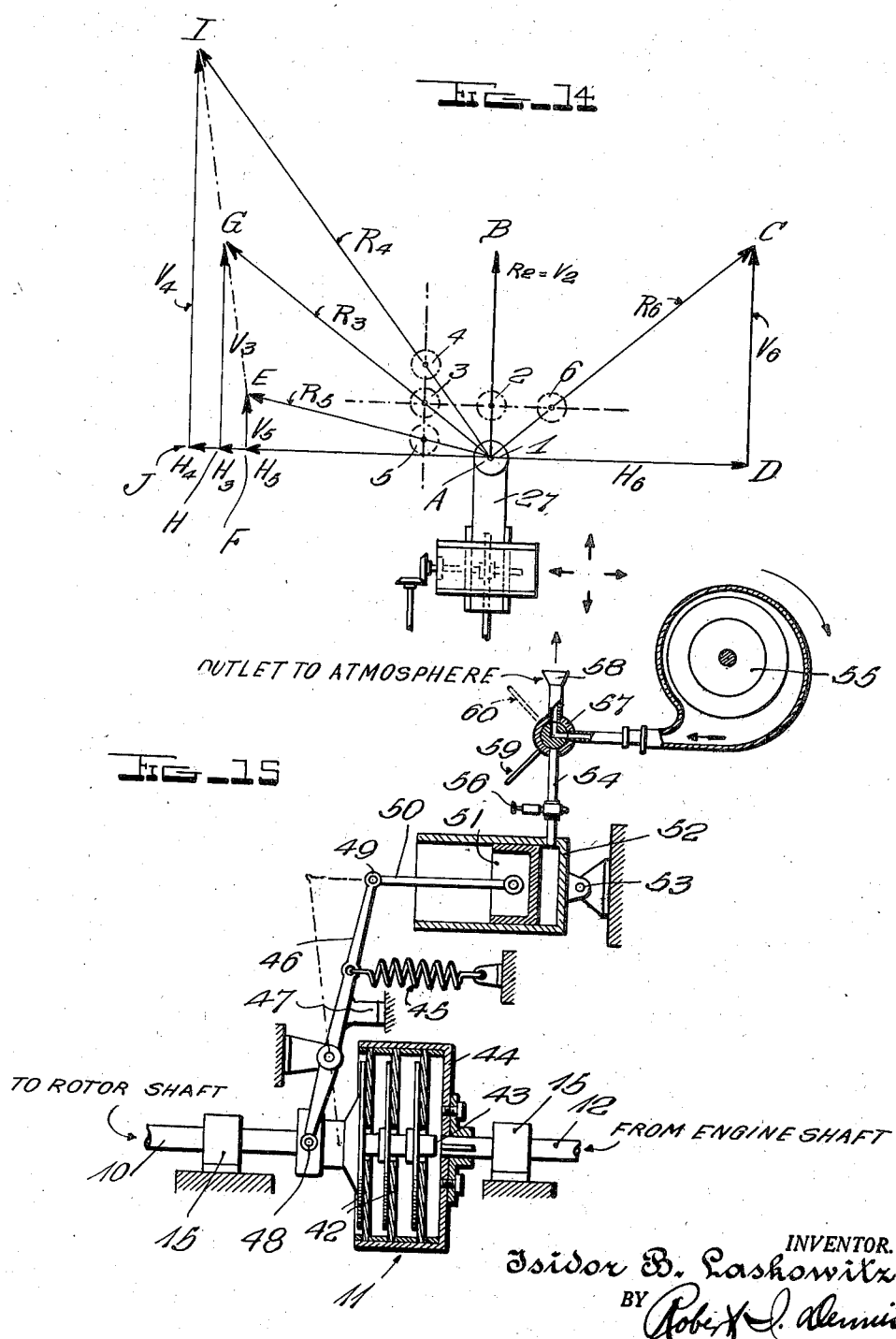

Patented May 4, 1937

2,079,217

UNITED STATES PATENT OFFICE 2,079,217

AUTO-CYCLO-GIRO

Isidor B. Laskowitz, Brooklyn, N. Y.

Application August 10, 1933, Serial No. 684,568

2 Claims. (Cl. 244—16)

The present invention relates to improvements in aircraft and particularly to that type of aircraft which is known as direct lift rotary aircraft, or aircraft of the "paddle wheel" type.

More particularly, this invention embodies the application and use of principles described and claimed in Patent No. 1,872,758, granted to me August 23, 1932, for a variable thrust mechanism, and of the application of additional inherent principles of the mechanism in the design and construction of such an aircraft.

Another important object of the invention is to provide for the ascent, descent, movement to the right or left in a vertical plane of the aircraft; to hover in the air or be suspended in the air without moving; to turn and bank, or roll, without the use of the conventional rudder and ailerons; to pitch the aircraft without the use of elevator surfaces; to be capable of causing movement about one axis for lateral movement, about another axis for pitching movement and about a still further axis for yawing (steering) movement, so as to control the aircraft in every possible way and under all conditions of flying, without the use of the rudder, ailerons or elevator; to provide means of permitting the aircraft to autorotate by automatically declutching the engine from the rotors, should the engine fail, thus permitting a safe descent without power, as in the autogiro, because of the parachute effect produced; to optionally provide the use of the rudder and elevator as in conventional aircraft construction, so as to provide greater maneuverability than would be afforded by fixed horizontal and vertical tail surfaces only; to provide structural means to transmit the loads from one rotor to the other on the opposite sides of the fuselage, with a tendency to balance one another, thereby reducing the stresses and making the supporting members lighter.

A still further object is to provide an aircraft construction which employs a pair of rotors arranged on opposite sides of the fuselage and which rotors take the place of the conventional fixed lifting wings and the customary tractor propeller.

Another object is to provide an aircraft of the direct lift type wherein the mechanism associated therewith will at all times be positive in action, easy to operate, thus assuring its practicability.

Other objects of the invention will become apparent from the following description when taken in connection with the accompanying drawings.

In the accompanying drawings, wherein like reference characters designate corresponding parts throughout the several views:

Figure 1 is a plan view of my improved aircraft;

Figure 2 is a front elevation thereof;

Figure 3 is a side view of the aircraft;

Figure 4 is an enlarged, fragmentary cross sectional view showing the guide means associated with the air foils of the rotors and the respective sides of the fuselage, as well as the driving means for the transversely extending driven shaft supporting the rotors;

Figure 5 is a fragmentary plan view of the inner end of the airfoils connected by means of rollers to the circular tracks;

Figure 6 is an enlarged detailed view of the airfoil or vane angle controlling mechanism that corresponds with Figure 3 of my prior Patent No. 1,872,758, with the exception that in Figure 6 of this application, separate inner rings are not used but a single ring is employed to simplify the construction, the section being taken approximately on the line 6—6 of Figure 4;

Figure 7 is a vertical section through one of the airfoils taken on the line 7—7 of Figure 5;

Figure 8 is a vertical section taken through one of the rotors showing the bracing means for the radial arms;

Figure 9 is a vertical section taken substantially on the line 9—9 of Figure 4 to more clearly disclose the construction of the stationary circular track and the trolley heads carrying rollers that engage with the track;

Figure 10 is a diagrammatic representation of the three axes about which movement of the aircraft may take place;

Figure 11 is a perspective view of the control elements of the movable elevator flap which is to have optional use only in this aircraft;

Figure 12 is a perspective view of the control elements for the rudder, which is to have optional use only in this aircraft;

Figure 13 is a diagrammatic illustration showing the aircraft in side elevation;

Figure 14 is a diagrammatic illustration of the different positions of the center of the eccentric bracket in relation to the supporting spindle or shaft, this view corresponding to Figure 9 of my Patent No. 1,872,758, except that in this application, the horizontal components of the various resultants shown in Figure 14, illustrate differences in the magnitude of the horizontal component and that these differences give rise to a yawing or steering movement without the use or need of a rudder; and Figure 15 is a schematic arrangement for automatically declutching the engine from the rotors, should the engine fail, to permit the rotors to be free to rotate.

In the present invention, in lieu of the conventional fixed lifting wings and tractor propeller, I employ two rotors that are arranged on opposite sides of the fuselage 7 as is clearly shown in Figures 1 and 2 of the drawings. Each rotor includes a series of airfoils or vanes 1 which are constructed of any suitable material. While I have illustrated three of such airfoils, any suitable number may be employed as is found necessary.

Each airfoil or vane is pivotally mounted adjacent one longitudinal edge as at 2 to the outer ends of the radial arms or spokes 4, there being anti-friction ball or roller bearings associated with the pivotal connection between the airfoils and the radial arms or spokes.

The parts that are fixedly secured together are preferably welded to each other although any other method of rigidly securing the elements together may be employed.

The inner ends of the radial arms or spokes are connected to a hub which in turn is fixed to the horizontally extending driven shaft 5. Suitable tie rods or braces 4a extend between the outer ends of the spaced radial arms or spokes and these rods or tie members are adjustable through the medium of turnbuckles 4b.

A driven shaft 5 extends transversely through the fuselage and is rotatably mounted in the bearings 6 which are supported by the frame or fuselage 7. Collars 8 are provided for centering purposes as well as taking up any sidewise movement.

A pair of intermeshing bevel gears 9 are associated with the shaft 5 and the shaft 10. An automatic disc clutch 11, shown in detail in Figure 15 of the drawings, is interposed between the shafts 10 and 12. The shaft 12 is driven from the engine 13 through a pair of intermeshing bevel gears 14. A pair of combined radial and thrust bearings 15 hold the shafts 10 and 12 in alignment. The engine is, therefore, capable of driving the rotors and hence the air foils 1, from its shaft through the bevel gears 14, through a disc clutch (when engaged) connecting shafts 10 and 12 and through the bevel gears 9 connecting the shaft 10 and the driven shaft 5. The radial arms or spokes 4 are trussed or braced by means of the longitudinal tie members 16 connected to the outer end of the shaft 5 and near the outer ends of the arms 4.

Forming a salient part of the present invention is a guide or stabilizing structure for the rotors. To this end, rods 17 project laterally from the inner ends of the airfoils or vanes 1. Trolley heads 17' are mounted on the outer extremities of the rods 17 and journaled in each of these heads is a pair of rollers 18. The rollers 18 are adapted to travel around the circular tracks 19 as clearly shown in Figures 4 and 5, said rollers engaging the inner edges of the respective circular tracks. The circular tracks 19 are secured on opposite sides of the fuselage 7, the tracks being rigidly supported by the radial arms 20. Suitable cross braces 21 extend between the tracks as shown in Figure 4 and this arrangement provides a trussed structure with a tendency to balance the loads from one rotor to the other, thus greatly reducing the stresses imposed and hence the weight of the aircraft.

Adjacent to the inner end of one of the airfoils of each rotor and located rearwardly of the complementary arm 4 in relation to the direction of rotation of the rotors, is pivotally connected as at 22 the outer end of an eccentric or actuating rod 23. The inner end of the rod 23 is integrally associated with the ring 25 that loosely encircles the transverse driven shaft 5.

Auxiliary actuating rods 24 are similarly connected at their outer ends to inner end portions of the other airfoils of the respective rotors, the inner ends of these rods 24 being also pivotally connected to the respective rings 25 as at 26 in Figure 6.

The inner rings 25 are carried by adjustable eccentric brackets 27. Ball bearings 28 are provided between each inner ring 25 and the complementary eccentric bracket 27 for free movement between the two. The means for adjusting the eccentric brackets 27 for producing various resultant forces, as will be hereinafter more fully described, is by means of the wheel and rocking bridge control mechanism denoted generally by the numeral 29 and which is fully disclosed in detail in my prior Patent No. 1,872,758.

Referring to Figure 13, a resultant force R is shown, which is produced by the rotation of the airfoils with a particular setting of the eccentric brackets 27, and which tends to move the aircraft in the direction shown by the arrow, marked "R". The resultant force R has a vertical component, V and a horizontal component H.

Reference is now had to Figure 14 which corresponds to Figure 9 in my Patent No. 1,872,758. There is shown resultant thrusts for various settings of the eccentric brackets 27. It will be observed that not only is there disclosed variations in vertical components for various settings of the eccentric bracket, which are essential for lateral control and stability, by "rolling" or "banking", but also variations in the horizontal component for various settings of the eccentric bracket, which are essential for yawing or steering. To effect changes in pitching movement, it is merely necessary to change positions in the eccentric brackets along the lines "3"—"2"—"6". All of the above variations of control and movement are possible without the use of ailerons, elevators or rudder. In other words, without the use of elevators, ailerons or rudder, it is possible to give the aircraft directional control in three planes, namely, lateral, vertical and horizontal. These movements take place around the three axes shown in Figure 10, namely, X—X; Y—Y and Z—Z axes.

Movement about the X—X axis causes banking or rolling and is depended upon to maintain lateral balance or stability and to incline the aircraft when making turns or to right it, if it flies with a high rotor. Movement about the Y—Y axis causes pitching and the positions of the eccentric bracket 27 regulate the extent of this motion. Movement about the Z—Z axis causes yawing or steering and regulates the direction of movement on a horizontal plane (to the right or left).

The aircraft is provided with fixed horizontal stabilizer surface 30 and fixed vertical fin 31 for stabilizing when in an air stream.

For increasing maneuverability, as desired, optional use is made of a rudder 32 and a movable elevator flap 33. The former is controlled by means of the conventional pivoted rudder bar actuated by the feet as shown in Figure 12. Control cables 35 connect the rudder bar and the rudder. The elevator flap 33 is controlled by the cables 36 extending from the levers 37 on a crossshaft 38 which is moved by pushing the lever 39 back and forth. The aircraft is also provided with a tail skid 40 and a streamlined landing gear 41 both of the conventional construction.

Attention is now directed to Figure 15 of the drawings, wherein there is disclosed the automatic disc clutch 11 which will now be described in detail. It is of utmost importance that as soon as the engine fails, while in flight, it should be immediately disconnected before appreciable elevation or altitude is lost, to permit the rotors to autorotate and produce a parachute effect for a slow, safe descent. I have, therefore, arranged the various parts of the automatic clutch structure so that the cutting out of the engine takes place automatically and without the loss of time. The multiple disc clutch consists of a number of discs 42 alternately secured to the rotor shaft 10 and to the engine shaft 12, both shafts dividing on the line 43. A housing 44 encases the discs holding the oil and also serves as a transmitting medium for the discs to the engine shaft 12. The discs 42 are normally held separated by the action of the spring 45 acting on the hinged lever 46 against the stop 47.

The lower end 48 of the lever 46 engages a free member so arranged that the discs might be brought together while rotating. The upper end 49 is connected to a piston rod 50 secured to the piston 51 that is slidably mounted in the cylinder 52, the latter being hinged at 53. The hinged end of the cylinder is connected by means of pipes 54 to the discharge end of a centrifugal compressor 55 driven by the engine shaft through the medium of suitable gearing or the like. In the air discharge piping 54, there is provided an air relief valve 56 for setting maximum pressures desired. A three-way cock 57 is also provided with connections capable of being made from the compressor discharge to the cylinder 52 or to the atmosphere. The lever 59 of the three-way cock 57 is so set in the drawings that when the engine is running, the discharge from the compressor will deliver into the atmosphere; the rotorshaft 10 and the rotors remaining stationary. By throwing the lever 59 to the position 60, the air is delivered to the cylinder 52 and movement of the piston 51 against the piston rod 50 and the lever 46 creates pressure against the discs and thus engages the engine shaft 12 and the rotor actuating shaft 10. So long as the engine is running, the engagement of the clutch and hence the engine and rotor shafts will be joined and operated with the lever 59 in position 60. Should the engine stop, however, the air pressure in the cylinder 52 would diminish to atmospheric and by means of the action of the spring 45 on the lever 46, the clutch 11 will become disengaged permitting the rotorshaft and the rotors to be free to autorotate.

Where the aircraft is provided with superchargers in connection with the engine, it would be merely necessary to connect thereto in any suitable manner, means for bleeding the supercharger in order to get a source of air under pressure, the supply being available only when the engine is running and stopped when the engine stops.

Referring again to Figure 14, the operation of the mechanism is carried out as follows. Both eccentric brackets 27 have been set from position "1" to position "2" (the best position for the operation of the aircraft). In position "2", the resultant thrust is substantially vertical. The intensity of this vertical thrust can be increased or decreased by increasing or decreasing the speed of the engine so that a raising, lowering or hovering of the aircraft can take place. The wheel and rocking bridge control mechanism is so arranged that for position "2", it is in a vertical position. Forward movement of the aircraft is accomplished by turning the control wheel so that both eccentric brackets are moved to position "3"; backward movement of the aircraft being accomplished by turning the control wheel in the opposite direction so that both of the eccentric brackets are moved to position "6".

With eccentric brackets in either position "2"; "3" or "6", or other intermediate position, movement of the eccentric bracket along the line, "3"—"2"—"6" gives rise to a pitching movement about the Y—Y axis.

By rocking the bridge forward or backward, the effect produced is a raising of one eccentric bracket and a lowering of the other bracket and vice versa. Positions "4" and "5" show locations of the eccentric brackets when the latter are displaced from their positions "3" by the rocking of the bridge. For position "2", it is obvious that since there are no horizontal components, the craft is capable of being rolled or banked about the X—X axis. Studying the horizontal and vertical components of the resultants R4' and R5', for positions "4" and "5", it will be observed that vertical component V4' is greater than V5' and that horizontal component H4' (distance from A to J) is greater than H5' (distance from A to F). Thus, for positions other than "2", as for "3" and "6" and any other intermediate positions, it is possible to roll the craft about the X—X axis and to turn the craft (about the Z—Z axis) and bank the craft (about the X—X axis) and thus be able to control and maintain stability in the three planes of reference without the use of ailerons, elevator or rudder.

Adverting to the mounting of the airfoils 1, in a pivotal manner on the outer ends of the radial arms or spokes 4, if the airfoils were rotating without any other movement in space, the pivotal connection 2 would merely undergo a circular motion. If, without the airfoils rotating they were dragged through space, they would describe a straight path or line. On the other hand, if both of these two motions were combined, that is, the rotary motion and the rectilinear or straight line motion, the path described by the pivotal connection 2 would be a cycloid. In vertical ascent or descent, it is, therefore obvious that the point described by the pivotal connection 2 is a cycloid. Also with the aircraft moving in a horizontal line to the right or left, it is again obvious that since rotary motion as well as rectilinear motion is given to the pivotal connection 2, a cycloid would be described. The airfoils when oscillating around the pivotal connection 2 with the latter describing paths of a cycloid will take various positions in relation to tangents along the cycloid.

It will thus be seen from the foregoing description, that I have provided an improved aircraft which will at all times be positive and efficient in its operation and also the provision of automatic declutching means which function when the engine fails, will permit the aircraft to autorotate and to permit of a safe descent without power as in the autogiro.

While I have shown the preferred embodiment of the invention, it is to be understood that minor changes in the size, shape and arrangement of parts may be resorted to without departing from the spirit of the invention and the scope of the appended claims.

Having thus described the invention what is claimed is:

1. In combination, an aeroplane fuselage, a pair of rotors arranged on opposite sides of the fuselage, a driven shaft on which the rotors are mounted extending transversely through the opposite sides of the fuselage, an engine, a drive shaft extending therefrom, a clutch interposed between the drive and driven shafts, an air compressor operable by the engine, means controlled by the fluid discharged from the compressor for actuating the clutch to operatively connect the engine and rotor shafts together, said means being automatically rendered inoperative to declutch the drive and driven shafts should the engine speed fall below a predetermined value, permitting the rotors to autorotate, said means including a cylinder into which the fluid from the compressor is discharged, a piston operable in the cylinder, a lever operatively connected to the piston and movable member of the clutch structure and spring means connected to the lever for normally holding the movable member of the clutch in an inoperative position.

2. In combination, an aeroplane fuselage, a pair of rotors arranged on opposite sides of the fuselage, a driven shaft extending transversely through the sides of the fuselage, said rotors being mounted on the driven shaft, an engine, a drive shaft extending therefrom, a centrifugal air compressor operable from the engine, a clutch structure including a movable member interposed between the drive and driven shafts, a cylinder, a pipe for delivering the fluid discharged from the compressor into the cylinder, a piston operable in the cylinder, a lever operatively connecting the piston with the movable member of the clutch structure whereby the clutch is actuated to connect the drive and driven shafts when the fluid actuates the piston in the cylinder, a manually controlled valve arranged in the pipe for delivering the fluid either to the cylinder or to the atmosphere, the clutch being automatically rendered inoperative to connect the drive and driven shafts when the speed of the engine falls below a predetermined value, permitting the rotors to autorotate.

ISIDOR B. LASKOWITZ.